Oct. 11, 1932.  E. C. HEAD  1,882,009

METHOD AND APPARATUS FOR RELIEVING HOBS

Original Filed Nov. 28, 1928   2 Sheets-Sheet 1

INVENTOR
Ernest C. Head
BY
his ATTORNEY

Oct. 11, 1932.  E. C. HEAD  1,882,009
METHOD AND APPARATUS FOR RELIEVING HOBS
Original Filed Nov. 28, 1928   2 Sheets-Sheet 2

INVENTOR
BY Ernest C. Head
ATTORNEY

Patented Oct. 11, 1932

1,882,009

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

METHOD AND APPARATUS FOR RELIEVING HOBS

Original application filed November 28, 1928, Serial No. 322,498. Divided and this application filed May 27, 1930. Serial No. 456,215.

The present invention relates to a method and to apparatus for relieving gear-cutting hobs and particularly hobs for cutting spiral bevel gears.

This application is a division of my pending application, Serial No. 322,498, filed November 28, 1928, covering a hob.

The primary purpose of this invention is to afford a method of relieving hobs, such as are employed in the cutting of longitudinally curved tooth gears, which will produce a hob capable of cutting curved teeth on a gear which will mesh with the teeth of a mating gear along a portion of their length only. With the present invention, therefore, hobs can be made which are capable of cutting longitudinally curved tooth tapered gears that will mesh with each other with a properly localized tooth bearing.

Prior to this invention, hobbed gears have lacked adjustment when in mesh because, with previous methods of hobbing, the tooth surfaces cut upon the two gears of a pair were of the same lengthwise tooth shape and would match each other along their whole length. Such gears had, therefore, to be very accurately and very rigidly mounted. As it is possible to cut longitudinally curved tooth tapered gears by other methods than a hobbing method and mismatch or localize the tooth bearings, the inability to hob such gears with a mismatch has heretofore been a serious drawback to the hobbing method. Gears without mismatch are unable to accommodate themselves to the inevitable inaccuracies of mounting and to the displacements under load which occur in commercial installations. The present invention enables this previous disadvantage to be overcome and permits of hobbing gears fully capable of accommodating themselves to variations in mountings or loads.

The present invention relates only to the relieving of the sides of the cutting teeth of hobs. The present invention is not concerned with the relieving of the tops of the hob teeth and the tops of the teeth may be relieved according to known practice or any suitable method.

By means of the present process, hobs are produced whose teeth are of different thicknesses. Preferably, the hobs are relieved so that the thickness of the hob teeth increases as compared with the thickness of the teeth of a standard hob, from a point midway the length of the hob toward both ends thereof. In a hob of constant pitch, this means that the teeth will be thinner midway the length of the hob than at the ends of the hob. When a hob relieved according to this invention is employed to cut a tapered gear, the thin teeth of the hob will operate midway the length of the teeth of the gear while the end teeth of the hob will operate on the ends of the teeth of the gear. Thus, tooth spaces will be cut on the gear blank which are narrower midway their length than at their ends and when such a gear is meshed with another gear cut by the same process or according to previous practice, it is obvious that the mating tooth surfaces of the two gears will bear or contact midway of their length but be out of contact at their ends. The bearing or tooth contact will be, in other words, localized.

The present invention may be applied to the relieving of hobs of either variable or constant pitch, whether cylindrical or tapered, in fact, to any form of hob for cutting longitudinally curved tooth tapered gears. In a specific aspect, the present invention has for its purpose to improve the form of hob produced by the relieving method of my pending application Serial No. 447,011, filed April 24, 1930, which is a division of my pending application Serial No. 278,208, filed May 16, 1928, and it is in connection with the improvement upon this prior invention of mine that the present invention is illustrated.

By my prior invention, I have shown the advantage of relieving a taper hob so that its cutting edges are of continuously changing pressure angle from one end of the hob to the other, as, with such a hob, gears having tooth spaces and teeth of properly tapering depth can be cut. By means of the present invention, it is possible to improve my prior relieving process further in such way as to permit the production of a hob which will not only cut gears having teeth and tooth spaces of properly tapering depth but with a localized tooth bearing.

The present invention may be practiced in various ways. According to the preferred embodiment, the relieving tool is swung in a circular arc as it moves from one end of the hob to the other during the relieving of the successive teeth of the hob, thereby feeding the relieving tool inwardly as it moves from one end of the hob to the center thereof and withdrawing the tool again as it moves from the center toward the other end of the hob.

Figure 2:
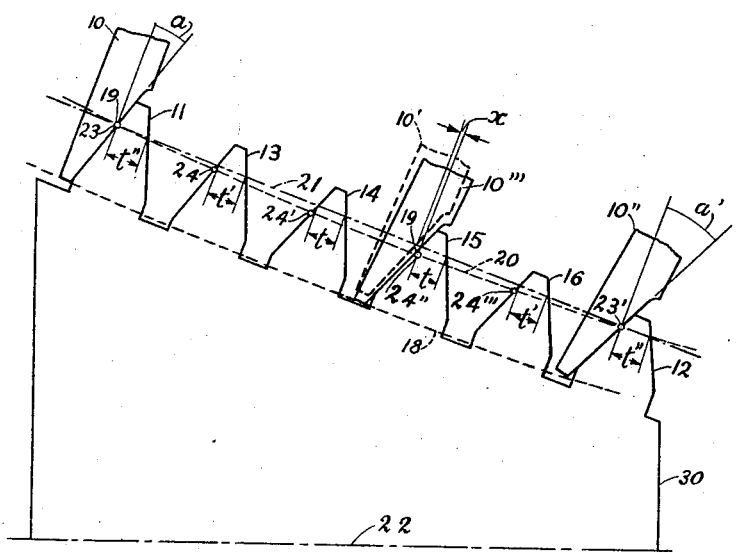
Figure 2 is a diagrammatic view illustrating the preferred method of relieving this hob.

As stated, the present invention will be described in connection with its application to the relieving process of my application No. 447,011 as affording a method for producing a still further improved form of hob. In relieving a hob according to the method of my pending application No. 447,011, the relieving tool is tilted continuously as it moves from one end of the hob to the other to form cutting edges on the hob of continuously changing pressure angle from one end of the hob to the other. 10, 10' and 10'' (Figure 2) show three positions of the relieving tool in relieving the teeth of a taper hob 30 by the process of my prior application No. 447,011. The relieving tool is tilted continuously as it moves from one end of the hob to the other so that the pressure angle $a$ of the tooth 11 at the large end of the hob is less than the pressure angle $a'$ of the tooth 12 at the small end of the hob. Due to the continuous tilting of the tool as it moves from one end of the hob to the other, the teeth 13, 14, 15, and 16 of the hob will have side cutting edges whose pressure angles are continuously increased over the pressure angle of the side cutting edges of the tooth 11 but which are smaller than the pressure angles of the side cutting edges of the tooth 12. As pointed out in my prior application, this method of relieving a taper hob results in a taper hob having teeth at its small end which are of greater strength than the teeth of taper hobs as relieved by prior processes.

In applying the present invention to my prior process, not only is the relieving tool tilted as it moves from one end of the hob to the other, but it is fed first inwardly and then outwardly so that it cuts on different teeth of the hob at different depths with reference to the operating pitch surface of the hob, thereby causing some of the teeth of the hob to be thinner than others. Preferably, this feed is obtained by feeding the relieving tool along a circular arc as it moves relatively from one end of the hob to the other. Thus, the tip of the relieving tool is moved on a circular arc 18 and any point 19 on the side surface of the tool moves on an arc, parallel to the circular arc 18. In the drawings the relieving tool is shown as positioned so that the point 19 operates on one side of the tooth 11 at a point 23 lying in the conical surface 21 coaxial with the axis 22 of the hob. As the tool moves from one end of the hob to the other, the point 19 travels on the arc 20, as described. Thus, the point 19 will act at points 24, 24', etc., below the surface 21 during the relieving of the teeth 13, 14, 15 and 16 and will again operate in the conical surface 21 when it engages the tooth 12 at 23'. Thus, due to its feed movement, the relieving tool will cut at a greater depth on the teeth 13, 14, 15 and 16, than on the teeth 11 and 12.

10''' indicates, for instance, as compared with 10', the distance the relieving tool will have moved inwardly when it has reached the tooth 15. This movement will cause a decrease of the amount indicated by the arrows at $x$ in the thickness of the tooth measured on the surface 21. As the opposite sides of the hob teeth are relieved in a manner similar to that illustrated it will be seen that a corresponding decrease in tooth thickness results during the relieving of the opposite side of the tooth 15. It will be seen, then, that as a result of the relieving method of this invention, the tooth 15 will be thinner measured on the conical surface 21, or on any conical surface coaxial with the hob, than the end teeth 11 and 12 of the hob and it will be understood that the teeth 13, 14 and 16 of the hob will also be thinner than the end teeth 11 and 12 in proportion to their respective positions along the length of the hob and the radius of the arc on which the relieving tool is swung.

Figure 1:
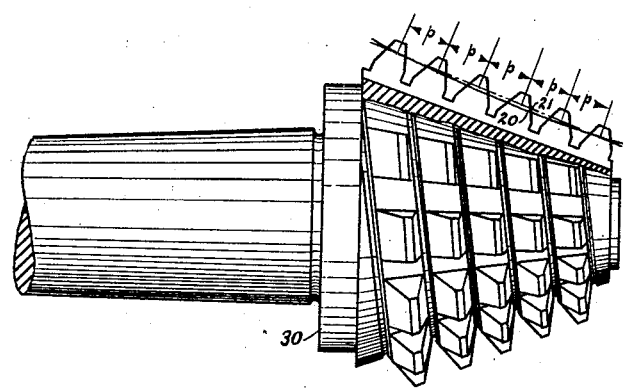
Figure 1 is a side elevation, partly in section, of a taper hob relieved according to this invention.

When the hob blank is rotated at a uniform velocity and the relieving tool is moved at a uniform velocity in timed relation with the blank rotation during the relieving of successive teeth of the hob, the lead of the hob will still remain uniform on the pitch line 21 despite the difference in thickness of its teeth measured on that line. Thus, as indicated in Figure 1, the distances $p$ measured on the line 21 from the center of one tooth of the hob to the center of another tooth in the same axial plane of the hob are equal. The hob differs from the usual taper hob of constant pitch, however, because its teeth are of changing thickness along the pitch line.

$t$ indicates the thickness measured on the surface 21 of the teeth 14 and 15, which are equi-distant from a point midway the length of the hob. This thickness $t$ is less than the thickness $t'$ of the teeth 14 and 15 measured on this surface 21 and the thickness $t'$ is in turn less than the thickness $t''$ of the teeth 12 measured on this same surface.

In the hob shown, the thickness of the hob teeth is uniform on the line 20, but on any parallel arc, due to the tilting motion of the tool in forming the sides of the hob teeth so that their pressure angles change from one end of the hob to the other, there is a variation from absolute uniformity of tooth thickness.

We have, then, as a result of the relieving method of this invention, a hob whose teeth are of varying thickness along the conical surface 21 or any conical surface coaxial with the hob axis 22. It will be readily apparent that when such a hob is in operative relation with a tapered gear blank with a conical surface of the hob tangent to the pitch cone surface of the gear and with the axis of the hob extending diagonally of the face of the blank, the hob will cut tooth spaces on the gear which are narrower midway their length than at their two ends. So the teeth of a tapered gear cut with a hob relieved according to this invention will be wider midway their length than at their ends and when the gear is meshed with a mating gear cut in the same way or according to previous practice, the teeth of the two gears will contact along a portion of their length only, thus having the desired localization of bearing which enables the gears to accommodate themselves to the variations in mounting and load which occur in practice.

Figure 3:
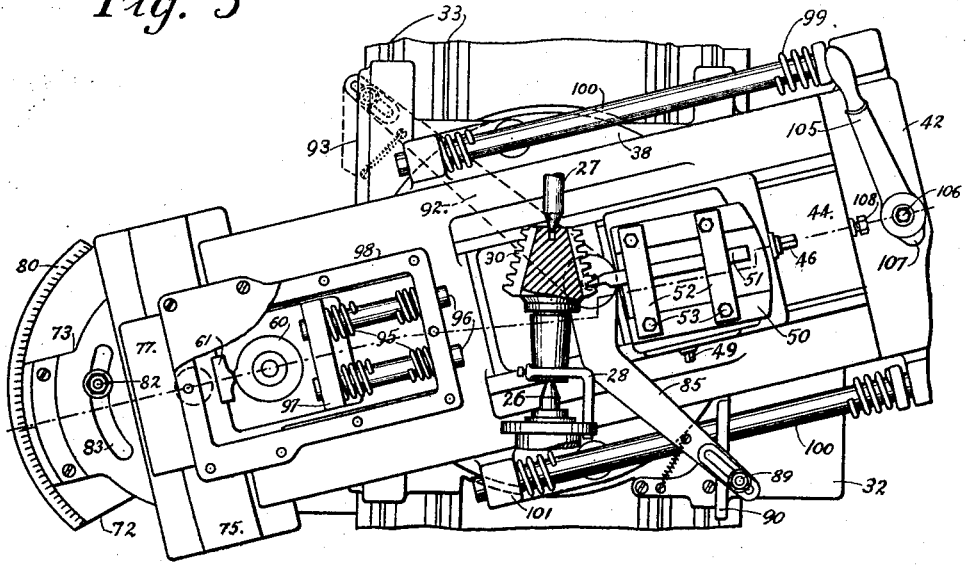
Figure 3 is a fragmentary plan view of a lathe provided with an attachment constructed according to a preferred embodiment of this invention adapted to relieve hobs according to the method of this invention.
Figure 4:
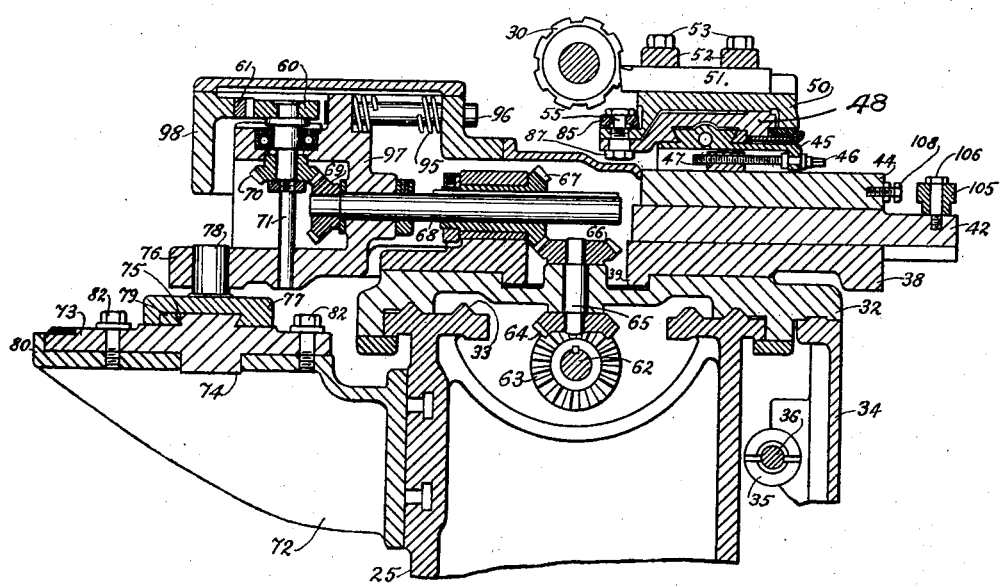
Figure 4 is a fragmentary sectional view through this lathe and attachment, taken on the line 4—4 of Figure 3.

Figures 3 and 4 illustrate a preferred form of apparatus for producing a hob according to this invention and in particular for producing a hob which has the characteristics of the hob described in my prior pending application No. 447,011. This apparatus is in the form of an attachment for a conventional form of lathe.

25 designates the bed of the lathe, 26 and 27 the head-stock and tail-stock centers, respectively, and 28 the driving dog. The work, that is, the hob 30 to be relieved, is mounted between the two centers and is rotated continuously during the relieving operation by the head-stock driving mechanism of the lathe. 32 indicates the lathe carriage which is mounted for sliding movement upon ways 33 formed on the bed 25 of the machine.

Secured to the carriage 32 is an apron 34 which carries a nut 35 that engages the lead screw 36 of the lathe. This lead screw 36 may be driven in timed relation with the rotation of the head-stock spindle in the usual or in any other suitable manner.

The carriage 32 carries the relieving attachment of this invention.

Mounted on the carriage 32 for angular adjustment thereon is a plate 38 of generally circular shape. This plate 38 is provided with an annular flange 39 that seats in a circular groove or socket provided therefor in the upper face of the carriage 32.

Reciprocably mounted upon the plate 38 is a carrier 42 which is guided in its reciprocating movement on the plate by suitable guide ways which engage corresponding guide surfaces formed on the carrier. The carrier 42 serves as a support for the relieving slide 44.

The relieving slide 44 carries a slide 45 which is adjustable on the slide 44 by means of the screw 46 and nut 47. Mounted on the slide 45 is another slide 48 which is adjustable on the slide 45 in a direction at right angles to the direction of adjustment of the slide 45. The adjustment of the slide 48 is accomplished by means of a screw 49 which threads into a nut (not shown) which is secured to the slide 45.

Mounted on the slide 48 for pivotal movement thereon is a tool block or support 50. The relieving tool 51 is secured to the support 50 by means of the straps 52 and bolt 53.

The pivotal movement of the support 50 takes place about the axis of a stud 55 which is journaled in the slide 48.

The relieving motion is imparted to the relieving tool 51 through reciprocation of the slide 44 by means of the snail-cam 60. This cam engages a contact member 61 which is secured to an extension of the slide 44. The cam 60 is rotated in timed relation with the rotation of the head-stock spindle and of the lead screw 36, being driven from the horizontal shaft 62 through a pair of miter gears 63 and 64, the vertical shaft 65 which is journaled in the carriage 32, the miter gears 66 and 67, the latter of which has a splined connection with the horizontal shaft 68 which is journaled in the angularly adjustable plate 38 and in the carrier 42, and the bevel gears 69 and 70, the latter of which is secured to the vertical shaft 71 to which the cam 60 is fastened. Any usual or suitable form of gearing may be employed for maintaining the timed relation between the various operating parts of the machine. An example of one form of such gearing is illustrated in my co-pending application above mentioned.

As the work rotates and the carriage 32 moves longitudinally on the bed 25 and the cam 60 imparts the relieving movements to the relieving tool 51, the relative feed movement which constitutes the novel feature of this invention is produced. The mechanism for producing this feed movement will now be described.

Secured to the bed or frame 25 at one side thereof is a bracket 72. Mounted on this bracket 72 for angular adjustment thereon is a guide plate 73. The guide plate 73 is provided with an integral stud 74 which is journaled in a suitable socket or recess formed in the bracket 72. The guide plate is formed with a guide way 75 which is of dove-tailed shape in cross section and, in the preferred embodiment, is curved longitudinally on a circular arc. Pivotally connected to an extension 76 formed on the carrier 42 is a follower 77. The follower 77 is provided with a pivot pin 78 that engages in a suitable socket or recess formed in the extension 76 of the carrier 42. The follower 77 is suitably shaped to engage the guide-way 75 of the guide plate 73 and a gib 79 may be provided for taking up wear.

If a cylindrical hob is to be relieved, the guide plate is ordinarily set in zero position so that the median line of the guide way 75 is parallel to the axis of the work. When a taper hob is to be relieved, the guide plate 73 is adjusted angularly on the bracket 72 preferably to an angle corresponding to the pitch cone angle of the hob. The bracket 72 is provided with a graduated flange 80 and the guide plate 73 with an index mark readable against the graduations on the flange 80 so that the guide plate can be set accurately in the required position. It is secured in any adjusted position by means of bolts 82 which pass through the arcuate slots 83 formed in the guide plate and thread into the bracket 72. It will be seen that as the carriage 32 moves longitudinally on the bed of the machine, the guide plate 73, through the guide way 75 and follower 77, will cause the carrier 38 to be moved inwardly as the relieving tool moves from one end of the hob to the center thereof and then outwardly as the relieving tool moves from the center to the other end of the hob. This is due to the arcuate shape of the guide rail. The movement of the relieving tool inwardly and then outwardly effects the required feed movement, causing the thickness of the teeth of the hob to be varied, as already described with reference to Figure 2. The radius of curvature, in fact, the general shape of the guide way 75 is determined by the amount of concentration or localization of bearing which it is desired to obtain on the gears to be cut with the hob relieved by the method of this invention.

As stated above, the present invention may be applied as an improvement to the relieving method described in my application No. 447,011. I have so shown it in the present application, both in Figure 2 and in Figures 3 and 4. The mechanism for producing the tilting motion of the relieving tool is the same as that shown in my prior application and reference may be had to that application for a more complete description thereof. This mechanism will be only briefly described here. The tilting movement of the relieving tool is effected by angular movement of the support 50 about the axis of the stud 55. When one side of the teeth of the hob is being relieved, the arm 85 is connected to the support 50 by engaging the opposed clutch teeth formed on the arm and the support 50 and clamping these teeth in engagement by threading up on the nut 87 which engages the stud 55. The arm 85 carries at its outer end a stud 89 on which is mounted a roller that is adapted to engage the vertical surface of a guide rail 90 which is secured to the carriage 32. It will be seen that as the tool slide 44 reciprocates under actuation of the cam 60, the tool support 50 will be rocked by reason of engagement of the roller carried by the arm 85 with the guide rail 90. Hence, as the relieving tool operates to relieve the side surfaces of each of the teeth of the hob, it will be tilted, causing the pressure angle of the teeth of the hob to be varied continuously from front to rear. The effect of this is to form teeth on the hob which will have the same cutting action after sharpening as when new, as fully described in the two applications above mentioned. It will be seen, moreover, that as the carriage 32 moves longitudinally and the carrier 42 is actuated by reason of the engagement of the follower 77 with the guide rail 75, the relieving tool support 50 will have a continuous tilting motion, producing a change in pressure angle of the cutting edges of the hob from one end of the hob to the other. When this change is such as to cause an increase in the pressure angles of the cutting edges as they approach the small end of the hob, the teeth at the small end of the hob will be stronger than in prior constructions, as clearly pointed out in the application above mentioned.

Where the relieving motion is being so effected, as just described, to produce teeth on the hob of changing pressure angle from front to rear with cutting edges of changing pressure angle from one end of the hob to the other, in relieving the side of the hob teeth opposite to that shown in Figure 3, the arm 85 is taken off of the attachment and an arm 92, shown in dotted lines, substituted therefor. This arm 92, like the arm 85 is secured to the rocking support 50 and carries at its outer end a roller which engages with the vertical guide surface of a rail 93 which is secured to the carriage 32 at a point diagonally opposite the point at which the guide rail 90 is secured. The operation of the arm 92 and the roller carried thereby is similar to that of the arm 85 and its roller. As the relieving slide 44 reciprocates, the relieving tool is tilted and this tilting motion is continuous from one end of the hob to the other due to the motion of the carriage 32 which causes a movement to be imparted to the carrier 42 by reason of the engagement of the follower 77, which is secured to the carrier, with the guide rail 75.

The operation of the attachment shown will be understood from the preceding description but may be briefly summed up here. The slides 45 and 48 are first adjusted in accordance with the diameter and pitch of the hob to be relieved and the plate 38 is adjusted angularly on the carriage 32 in accordance with the pitch cone angle of the hob to be relieved. By means of this last adjustment, it is possible to position the relieving tool 51 so that it operates in a direction substantially perpendicular to the cone surface of the hob, thereby avoiding any possible slippage between the cutting edge of the tool and the teeth being relieved. The plate 73 is, also, adjusted angularly on the bracket 72 in accordance with the pitch cone angle of the hob. The curvature or conformation of the guide way 75 of this plate 73 is selected in accordance with the changes which it is desired to effect in the standard thickness of teeth of the hob which, of course, is governed by the amount of localization or concentration of bearing which it is desired to produce on the teeth of gears cut with the hob. One or other of the arms 85 or 92 is secured to the tool support 50 depending upon which side of the hob teeth is to be relieved.

When the machine is started up, the headstock center 26, the lead screw 36 and the cam 60 will rotate in timed relation. Thus, as the work rotates, the carriage 32 moves longitudinally and the cam 60 imparts relieving movement to the relieving tool. As each tooth of the hob rotates under the relieving tool, the tool is fed inwardly by means of the cam 60 and as soon as the tooth clears the tool, the tool is returned quickly to its initial position ready for operation upon the succeeding tooth of the hob by means of springs 95 which are mounted upon guide rods 96. The springs 95 are interposed between a ledge 97 formed on the extension 76 of the carrier 42 and a wall 98 of the slide 44. The guide rods 96 themselves are secured in the ledge 97 and slide in suitable openings provided in the wall 98. During the movement of the relieving slide 44, the tool is tilted continuously by reason of the engagement of the roller carried by the arm 85 or 92 with the guide surface 90 or 93 as the case may be. This tilting movement of the tool produces, as already stated, side tooth surfaces on the teeth of the hob which are of changing pressure angle or inclination from front to rear.

As the carriage 32 moves longitudinally, carrying the tool into position for engagement with successive teeth of the rotating hob blank, the angle of inclination of the cutting edge of the relieving tool with reference to the axis of the hob blank is changed continuously due to the feed movement imparted to the tool by the movement of the carrier 42 under actuation of the guide rail 75 and follower 77. This continuous tilting movement of the tool acts, as above described, to produce cutting edges on successive teeth of the hob which are of continuously varying pressure angle from one end of the hob to the other. Simultaneously, the relieving tool receives a feed movement inwardly and then outwardly, on the arc of a circle, if an arcuate guide 75 is employed as shown in Figure 3. This causes the relieving tool to cut deeper on certain teeth of the hob than on others, as clearly illustrated in Figure 2, the point 19 in the cutting edge of the hob traveling, for instance, on the circle 20. The guide rail 75 serves, also, to maintain the relieving tool in operative relation with the successive teeth of the hob despite the taper of the hob, since the guide rail is disposed at an angle to the axis of the hob corresponding to the pitch cone angle of the hob.

The springs 99 which are mounted upon rods 100 that are secured in the carrier 42 and slide in lugs 101 formed on the angularly adjustable plate 38, serve to absorb any tendency toward vibration of the carrier 42 during its movement under actuation of the guide rail 75 and follower 77 and they serve, also, to return the carrier 42 to original position during the return movement of the carriage 32.

A lever arm 105 which is pivoted on a stud 106 secured in the carrier 42, is provided to permit disengaging the contact piece 61 from the cam 60 during the return movement of the carriage 32. When the lever arm is swung outwardly from the position shown in Figure 3, its nose 107 engages the head 108 of a screw threaded into the relieving slide 44 and disengages the contact piece 61 from the cam 60.

While I have described my invention in connection with a specific embodiment, it will be understood that it is capable of various further modifications without departing from its scope and that this application is intended to cover any adaptations, uses, or variations of my invention, following, in general, the principles of the invention and including such departures from the present disclosure as come within known or customary practice in the art and as may be applied to the essential features hereinbefore set forth and as fall within the scope of the invention or the limits of the appended claims.

Having thus described my invention, what I claim is:

1. The method of forming a hob which comprises effecting a relative relieving movement between the hob blank and a relieving tool for each tooth of the hob while rotating the hob blank on its axis and moving the relieving tool and blank relative to one another to cause the relieving tool to follow the hob thread, and producing an additional relative movement between the tool and blank, separate from the relieving movement, of advance and recession relative to the axis of the hob as the tool moves relatively lengthwise of the blank, to cause the tool to follow a line other than the pitch line of the hob as it moves relatively from one end of the hob to the other.

2. The method of forming a hob which comprises effecting a relative relieving movement between the hob blank and the relieving tool for each tooth of the hob while rotating the hob blank on its axis and moving the relieving tool and blank relative to one another from one end of the blank to the other along a curved line to cause the relieving tool to follow the hob thread and produce teeth on the hob of varying thickness along the operating pitch surface of the hob.

3. The method of forming a hob which comprises effecting a relative relieving movement between the hob blank and the relieving tool for each tooth of the hob while rotating the hob blank on its axis and moving the relieving tool and blank relative to one another to cause the relieving tool to follow the hob thread, while tilting the tool angularly as it moves from one end of the hob to the other to cause the tool to produce cutting edges on the teeth of the hob changing in pressure angle from one end of the hob to the other, and producing an added relative movement between the relieving tool and blank to cause the relieving tool to cut deeper relative to the pitch surface of the hob on certain teeth of the hob than on others.

4. The method of relieving the side faces of the teeth of a hob which comprises producing a relative relieving movement between the relieving tool and the hob blank for each tooth of the hob while rotating the blank on its axis and producing a relative movement between the relieving tool and blank longitudinally of the blank in which the tool is moved relative to the blank on a circular arc.

5. The method of relieving the side faces of the teeth of a hob which comprises producing a relative relieving movement between the relieving tool and the hob blank for each tooth of the hob while rotating the blank on its axis at a uniform velocity and producing a relative movement between the tool and the blank at a uniform velocity in a direction longitudinal of the hob and simultaneously producing a feed movement between the tool and blank during the last named movement to cause the relieving tool to form teeth on the blank of varying thickness along the operating pitch surface of the hob.

6. The method of relieving the side faces of the teeth of a hob which comprises producing a relative relieving movement between the relieving tool and the hob blank for each tooth of the hob while rotating the blank on its axis at a uniform velocity and producing a relative movement between the tool and blank at a uniform velocity in a direction longitudinal of the hob and simultaneously feeding the tool inwardly and then outwardly relative to the blank as the tool moves from one end to the center of the blank and then to the other end thereof during the last named relative movement.

7. The method of relieving the side faces of the teeth of a hob which comprises producing relative relieving movements between the relieving tool and the hob blank while rotating the blank on its axis at a uniform velocity and producing a relative movement between the tool and blank at a uniform velocity in a direction longitudinal of the hob and simultaneously moving the relieving tool bodily along a circular arc relative to the blank during the last named movement.

8. The method of relieving the side faces of the teeth of a taper hob which comprises effecting a relieving movement between the relieving tool and hob in a direction inclined to the cone surface of the hob while rotating the blank on its axis and producing a relative movement between the tool and blank in a direction longitudinal of the hob during which the tool is fed relative to the hob blank to produce teeth on the hob of varying thickness along a conical surface coaxial with the axis of the hob blank.

9. The method of relieving the side faces of the teeth of a taper hob which comprises effecting relieving movements between the relieving tool and hob blank in a direction inclined to the cone surface of the hob while rotating the blank on its axis at a uniform velocity and producing a relative movement between the tool and blank at a uniform velocity in a direction longitudinal of the hob during which the tool is fed relative to the blank to produce teeth on the hob of varying thickness along a conical surface coaxial with the hob.

10. The method of relieving the side faces of the teeth of a taper hob which comprises effecting relieving movements between the relieving tool and the hob blank in a direction inclined to the cone surface of the blank while rotating the blank on its axis and producing a relative movement between the tool and blank in a direction longitudinal of the blank during which the relieving tool is fed inwardly toward the axis of the blank as it moves from one end of the blank to the center thereof and is then withdrawn outwardly as it moves from the center to the other end thereof.

11. The method of relieving the side faces of the teeth of a taper hob which comprises effecting relieving movements between the relieving tool and the hob blank in a direction inclined to the cone surface of the blank while rotating the blank on its axis at a uniform velocity and producing a relative movement between the tool and blank at a uniform velocity in a direction longitudinal of the blank during which the tool is fed inwardly toward the axis of the blank as it moves from one end of the blank to the center thereof and is withdrawn outwardly as it moves from the center to the other end of the blank.

12. The method of relieving the side faces of the teeth of a taper hob which comprises effecting relative relieving movements between the hob blank and the relieving tool in a direction perpendicular to the cone surface of the blank while rotating the blank on its axis at a uniform velocity and producing a relative movement between the hob and blank longitudinally of the blank at a uniform velocity and simultaneously moving the relieving tool bodily relative to the blank on a circular arc to cause the relieving tool to cut at varying depths as it moves from one end of the hob to the other.

13. The method of relieving a taper hob which comprises producing relative relieving movements between the hob blank and the relieving tool to relieve the side faces of the teeth of the blank and, while rotating the hob blank on its axis and simultaneously producing a relative movement between the blank and the relieving tool longitudinally of the blank and a continuous feed movement between the hob and blank in one direction as the tool moves relatively from one end of the blank to the other, tilting the relieving tool continuously as it moves from one end of the blank to the other and simultaneously producing a supplemental feed movement of the tool to cause the tool to move inwardly as the tool moves from the center to one end of the hob and outwardly as the tool moves from the center to the other end of the hob.

14. In apparatus for relieving hobs, a tool support, a rotatable work support, a carriage on which one of said supports is mounted, means for producing relative relieving movements between the tool and work supports, means for rotating the work support, means for moving the carriage axially of the work, and means for producing a movement of approach and recession between the tool and work supports as the tool moves relatively from one end of the work to the other to cause the tool to cut at different depths, relative to the operating pitch line of the hob, at different points along the length of the hob.

15. In apparatus for relieving hobs, a bed, a work support journaled in the bed, a carriage mounted on the bed for movement axially of the work support, a carrier slidably mounted on the carriage, a slide adjustable angularly on the carrier and reciprocable thereon, a tool support mounted on the slide, means for rotating the work support, means for effecting movement of the carriage, means operated by movement of the carriage for effecting a movement of advance and recession of the carrier relative to the work support, and means for reciprocating the slide to impart relieving movements to the tool.

16. In apparatus for relieving hobs, a bed, a work support journaled on the bed, a carriage mounted on the bed for movement axially of the work support, a carrier slidable on the carriage, a slide reciprocable on the carrier, a tool support mounted on the slide, means for rotating the work support, means for effecting movement of the carriage, means operated by movement of the carrier for effecting a movement of advance and recession of the carrier relative to the work support, and means for reciprocating the slide to impart relieving movements to the tool.

17. In a machine for relieving hobs, a bed, a carriage mounted on the bed for movement longitudinally thereon, a tool support and a work support, one of which is mounted on the bed and the other on the carriage, means for rotating the work support, means for effecting movement of the carriage, means for producing relative relieving movements between the tool and work supports during the before-mentioned movements, and means operative on movement of the carriage for producing a movement of approach and recession between the tool and work supports as the tool moves relatively longitudinally of the work.

18. In a machine for relieving hobs, a bed, a carriage mounted on the bed for movement longitudinally thereon, a tool support and a work support, one of which is mounted on the bed and the other on said carriage, means for rotating the work support, means for effecting movement of said carriage, means for producing relative relieving movements between the tool and work supports during the before-mentioned movement, a carrier on which one of said supports is mounted, a control member secured to the bed and having a guide surface curved longitudinally with reference to the direction of travel of the carriage, and means operatively connecting the carrier with the control member whereby, on movement of said carriage, said carrier is moved transversely of the direction of movement of the carriage to cause a movement of relative approach and recession between the tool and work supports as the carriage moves on the bed.

19. In a machine for relieving hobs, a bed, a carriage mounted on the bed for movement longitudinally thereon, a tool support and a work support, one of which is mounted on the bed and the other on said carriage, means for rotating the work support, means for effecting movement of the carrier, means for producing relative relieving movements between the tool and work supports, during the before-mentioned movement, means operative on movement of the carrier for producing a movement of approach and recession between the tool and work supports as the tool moves relatively longitudinally of the work, and means whereby the movement of the carriage causes the tool support to be tilted, as the carriage moves on the bed and during the relieving of each tooth of the hob, to cause the tool to form teeth on the hob with cutting edges of changing pressure angle from one end of the hob to the other and with side faces of changing pressure angle from front to rear.

20. In apparatus for relieving hobs, a tool support, a rotatable work support, a carriage on which one of said supports is mounted, means for moving the carriage longitudinally of the work, means for rotating the work support on its axis, means for imparting relative relieving movements between the tool support and work support in timed relation to the work and carriage movements, and means for simultaneously moving the tool in a circular arc as it is moved longitudinally of the work by the motion of the carriage.

21. In apparatus for relieving taper hobs, a bed, a reciprocable tool slide, a rotatable work spindle, a carriage movable longitudinally of the work, a tool support mounted on the slide and adapted to carry the side-relieving tool, a carrier on which the slide is reciprocable, said carrier being mounted for angular adjustment on the carriage, a guide member secured to the bed and having an arcuate guide surface, a follower carried by the carrier and adapted to engage said guide surface for imparting a feed movement to said carrier as the carriage moves longitudinally, means for actuating the carriage, means for reciprocating the tool slide to impart relieving movements to the tool, and means for rotating the work spindle on its axis.

22. In apparatus for relieving hobs, a tool support, a rotatable work support, a carriage upon which one of said supports is mounted, means for moving the carriage longitudinally of the work, means for rotating the work support on its axis, means for imparting a relative relieving movement between the tool support and the work support in timed relation to the work and carriage movements, means for moving the tool inwardly and then outwardly as the tool moves from one end of the work to the other, and means for simultaneously changing the inclination of the side cutting edge of the relieving tool relative to the axis of the work as the tool moves from one end of the work to the other.

23. In a machine for relieving taper hobs, a tool support, a rotatable work support, a carriage upon which one of said supports is mounted, means for rotating the work, means for moving the carriage longitudinally of the work, means for imparting relieving movements to the tool in timed relation to the work and carriage movements, means for feeding the tool support inwardly and then outwardly as the tool moves from one end of the work to the other, and means whereby the movement of the carriage acts to change the inclination of the side cutting edge of the tool to the axis of the work as the tool moves from one end of the work to the other.

24. In apparatus for relieving taper hobs, a bed, a reciprocable tool slide, a rotatable work spindle, a carriage movable longitudinally of the work, a tool support rotatably mounted on the slide and adapted to carry a relieving tool, a carrier upon which the slide is reciprocable, a plate upon which the carrier is movable, said plate being mounted on said carrier for angular adjustment thereon to position the tool slide and carriage for movement in a direction perpendicular to the cone surface of the work, an angularly adjustable guide member mounted on the bed and having an arcuate guide surface, a follower secured to said carrier adapted to engage said guide surface, means for rotating the work spindle on its axis, means for imparting movement to the carriage, means for reciprocating the tool slide, a second guide member mounted on said carriage, and a follower secured to the tool support adapted to engage said second guide member whereby movement of the tool carriage acts to move the tool support continuously during movement of the carriage to change the inclination of the side cutting edge of the tool continuously relative to the axis of the work as the tool moves from one end of the work to the other.

ERNEST C. HEAD.